United States Patent
Kawamura

[11] Patent Number: 5,932,104
[45] Date of Patent: Aug. 3, 1999

[54] FILTRATION MEMBRANE FOR OLEOPHILIC ORGANIC LIQUIDS, METHOD FOR PRODUCING IT, AND METHOD FOR FILTERING OLEOPHILIC ORGANIC LIQUIDS

[75] Inventor: Masuhiko Kawamura, Aichi, Japan

[73] Assignee: Kabushiki Kaisha Toyota Chuo Kenkyusho, Aichi-ken, Japan

[21] Appl. No.: 08/746,214

[22] Filed: Nov. 7, 1996

[30] Foreign Application Priority Data

Nov. 10, 1995 [JP] Japan ................................ 7-317408

[51] Int. Cl.⁶ .................................................. B01D 61/00
[52] U.S. Cl. .......................... 210/651; 210/649; 210/654; 210/490; 210/799; 264/41; 264/45.1
[58] Field of Search ...................... 210/651, 644, 210/654, 650, 643, 500.27, 500.35, 500.38, 649, 490, 799; 264/41, 45.1

[56] References Cited

U.S. PATENT DOCUMENTS

| | | |
|---|---|---|
| 3,919,075 | 11/1975 | Parc et al. . |
| 3,956,112 | 5/1976 | Lee et al. ................................ 210/643 |
| 4,377,481 | 3/1983 | Jakabhazy ................................ 264/41 |
| 4,814,088 | 3/1989 | Kutowy et al. . |
| 4,874,567 | 10/1989 | Lopatin et al. ........................ 264/45.1 |
| 4,978,454 | 12/1990 | Sweet ................................... 210/651 |
| 5,238,567 | 8/1993 | Pasternak . |
| 5,265,734 | 11/1993 | Linder et al. .......................... 210/654 |
| 5,360,530 | 11/1994 | Gould et al. ........................... 210/654 |
| 5,811,379 | 9/1998 | Rossi et al. ............................ 508/591 |

FOREIGN PATENT DOCUMENTS

| | | |
|---|---|---|
| 0 214 672 | 3/1987 | European Pat. Off. . |
| 54-13509 | 2/1979 | Japan . |
| 3-130570 | 6/1991 | Japan . |
| 6-1859 | 1/1994 | Japan . |
| 7-185206 | 7/1995 | Japan . |
| 9 002 704 | 7/1992 | Netherlands . |

*Primary Examiner*—Ana Fortuna
*Attorney, Agent, or Firm*—Oblon, Spivak, McClelland, Maier & Neustadt, P.C.

[57] ABSTRACT

The invention is to provide a filtration membrane for oleophilic organic liquids, which has reduced filtration resistance and increased filtration efficiency and of which the filtration capacity can be freely designed, to provide a method for producing the membrane, and to provide a method for filtering oleophilic organic liquids. The filtration membrane 3 is made of an oleophilic polymer material having a three-dimensional crosslink structure. The oleophilic polymer material is in a gel-like or dry glue-like condition. The inter-crosslink spaces 10 in the three-dimensional crosslink structure are filled with molecules 2 of an oleophilic organic liquid capable of passing through the spaces. Desirably, the inter-crosslink spaces in the three-dimensional crosslink structure are larger than the molecule of the oleophilic organic liquid but are not larger than 1000 nm in terms of their mean diameter. Also desirably, the oleophilic polymer material is supported by a support.

15 Claims, 8 Drawing Sheets

FILTRATION MEMBRANE FOR OLEOPHILIC ORGANIC LIQUIDS, METHOD FOR PRODUCING IT, AND METHOD FOR FILTERING OLEOPHILIC ORGANIC LIQUIDS

BACKGROUND OF THE INVENTION

1. Field of the Invention

The present invention relates to a filtration membrane for oleophilic organic liquids, capable of removing fine impurities that exist in an oleophilic organic liquid from the liquid as efficiently as possible, to a method for producing the filtration membrane, and to a method of using the filtration membrane for filtering an oleophilic organic liquid.

2. Description of the Related Art

Engine oil for cars is needed to have the function for lubrication, cooling, sealing, cleaning, rust inhibition, etc. Therefore, various additives shall be incorporated in it. These additives are deteriorated by various impurities to be introduced thereinto and by high temperatures during driving of cars, and undergo various chemical modifications caused by such impurities. As a result, their performance is degraded. When metals are processed by discharge erosion in oil, the oil is contaminated by impurities such as metal powders.

Contaminated oil that contains such various impurities has been recycled through a filtration membrane. For example, a polyacrylonitrile membrane, a polysulfone membrane or a cellulose acetate membrane as shown in Japanese Patent Publication No. 62-11883 have heretofore been used as the filtration membrane of this type in a method for filtering contaminated oil through a filtration membrane.

However, the conventional filtration membranes involve the following problems.

First, the filtration membranes, as being hydrophilic resins, shall be produced in hydrated conditions. Therefore, if the membranes are used for filtering oleophilic organic liquids, such as oil, they must be converted into oleophilic membranes, prior to use, through complicated solvent substitution where water existing in the membranes is replaced first with a hydrophilic solvent and thereafter with a solvent with stronger oleophilicity in due order thereby finally converting the membranes into oil-containing membranes.

The conversion of hydrophilic filtration membranes into oil-containing membranes shall change the size of the pores in the membranes, and it is impossible to control the size of the pores necessary for filtration. Even if such hydrophilic filtration membranes could be converted into oil-containing membranes, their filtration resistance to oil is large and their filtration efficiency is low since the membranes themselves are made of hydrophilic materials.

SUMMARY OF THE INVENTION

In consideration of such problems with the conventional filtration membranes, the present invention is to provide a filtration membrane for oleophilic organic liquids, which has reduced filtration resistance and increased filtration efficiency and of which the filtration capacity can be freely designed, to provide a method for producing the membrane, and to provide a method for filtering oleophilic organic liquids.

The first aspect of the present invention is a filtration membrane for filtering an oleophilic organic liquid, comprising an oleophilic polymer material having a three-dimensional crosslink structure. As being oleophilic, the filtration membrane of the invention can be preferably used for filtration of oleophilic organic liquids and its filtration efficiency is high.

The second aspect of the present invention is a method for producing a filtration membrane for oleophilic organic liquids, comprising the steps of mixing non-crosslinked oleophilic polymer molecules having a crosslinkable point with an oleophilic organic liquid that does not crosslink with the oleophilic polymer molecules; and crosslinking the non-crosslinked oleophilic polymer molecules at the crosslinkable point to form a three-dimensional crosslink structure. According to this method, there is obtained a three-dimensional crosslink structure suitable for filtration, via a gel-like state where molecules of an oleophilic liquid have been dispersed in an oleophilic polymer matrix. By adjusting the crosslink density of the structure, the filtration capacity of the membrane can be freely designed. In addition, if a suitable support is used as the core for the membrane, it is possible to obtain a shaped filtration membrane having a predetermined size and predetermined form.

The third aspect of the present invention is a method for filtering an oleophilic organic liquid to remove impurities therefrom, comprising the step of applying a solution comprising an oleophilic organic liquid and impurities larger than a molecule of the liquid to an oleophilic organic liquid filtration membrane, the filtration membrane comprising an oleophilic polymer material having inter-crosslink spaces in a three-dimensional crosslink structure, the spaces being filled with molecules of the oleophilic organic liquid capable of passing through the inter-crosslink spaces. According to this method, for example, it is possible to effectively separate from an oleophilic organic liquid, even extremely fine substances, such as abraded powder of metal, sludge or soot, which, as being too fine, could not be separated at all by conventional filters, so far as the substances are larger than the molecules of the oleophilic organic liquid to be separated therefrom.

Here, an inter-crosslink space means a space difined by at least one crosslink and/or at least one segment of molecules, for example, as shown in FIG. 1.

DETAILED DESCRIPTION OF THE INVENTION

Figure 1:
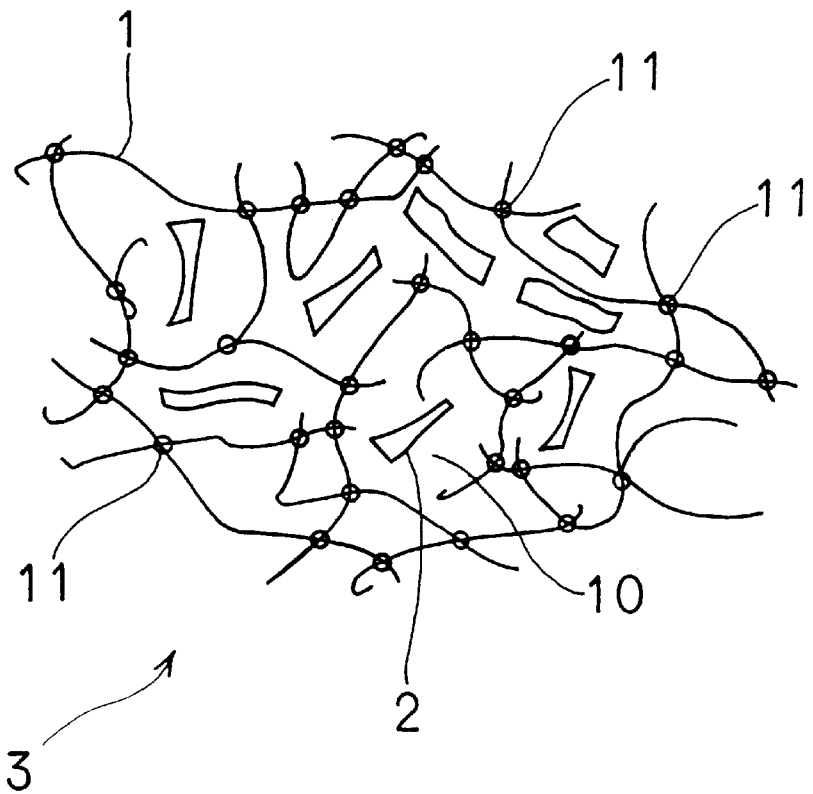
FIG. 1 is an explanatory view illustrating one embodiment of the filtration membrane for oleophilic organic liquids of the present invention, as prepared in Example 1.

In the first aspect of the present invention, the three-dimensional crosslink structure is, as shown in FIG. 1, a structure in which each molecule 1 of an oleophilic polymer material forms intermolecular crosslinks at three or more crosslink points 11 to lose its mobility.

As being made of an oleophilic polymer material, the filtration membrane for oleophilic organic liquids of the present invention does not require any complicated solvent substitution prior to use for filtering an oleophilic organic liquid therethrough. In addition, since the filtration membrane is made of an oleophilic polymer material, it can well wet with oil and so that oil can easily penetrate into the inside of the membrane. For these reasons, the filtration resistance of the membrane is low and the filtration efficiency thereof is high.

Accordingly, the filtration membrane of the present invention is the most suitable as a filter for filtering oleophilic organic liquids therethrough.

The "oleophilic organic liquids" as referred to herein are hardly water-soluble ones of organic liquids. Concretely exemplified as such oleophilic organic liquids are lubricating oils; liquid hydrocarbons such as hexane and octane; ordinary oils and fats; petroleum, etc. Additionally mentioned are hardly water-soluble alcohols. However, water-soluble alcohols, such as methanol and ethanol, as well as other water-soluble acetone, glycerin, phenol, cresol and the like are not within the scope of the oleophilic organic liquids.

The filtration membrane of the present invention is especially suitable for filtration of oils of oleophilic organic liquids such as those mentioned hereinabove. The oils may be any of petroleum oils, animal oils and synthetic oils and include, for example, lubricating oils, hydraulic oils and metal processing oils. The filtration membrane of the present invention can be used in the process of producing such oils for purification and filtration thereof.

One example of lubricating oils comprises, as shown in Table 1 below, an oily substance generally referred to as a "base oil", and various additives, such as antioxidant, extreme-pressure additive, viscosity index improver, detergent and dispersant, added thereto. As the base oil, generally used is a high-boiling fraction to be obtained in fractionation of petroleum (crude oil). A synthetic oil may also be used, as the case may be. In use, lubricating oils are deteriorated due to foreign impurities such as abraded powders to be introduced thereinto, and also due to the oxidation, decomposition and reaction of themselves, thereby losing their intrinsic properties.

The filtration membrane for oleophilic organic liquids of the present invention can separate and remove impurities, such as those mentioned hereinabove, from lubricating oils thereby recovering the original properties of lubricating oils to make it possible to continuously use the oils. In addition, the filtration membrane of the invention can filter and purify waste oils therethrough for recycling them, whereby invaluable natural resources can be utilized effectively.

|  | Components | Molecular Weight | Size |
|---|---|---|---|
| lubricating Oil | Base Oil | 100~1,000 | ~100 nm |
|  | Antioxidant | 200~2,000 | ~200 nm |
|  | Extreme-pressure Additive | 200~2,000 |  |
|  | Detergent | 1,000~3,000 | ~300 nm |
|  | Dispersant | 3,000~5,000 | ~500 nm |
|  | Viscosity Index Improver | 5,000~300,000 | ~30,000 nm |
| Impurities | Sludge |  | 500~1,000 nm |
|  | Soot |  | 20~1,000 nm |
|  | Abraded Powder |  | 100 nm~ |
|  | Dust |  | 100 nm~ |

Size: Straight length measured on the basis of the C—C distance estimated to be 0.15 nm The inter-crosslink spaces in the filtration membrane of the present invention are not pores as physically formed through the membrane, such as those in ordinary membrane filters, but are structural spaces themselves in the polymer crosslink structure that constitutes the membrane. Therefore, the principle of the filtration according to the present invention shall be such that a liquid as applied to the membrane "penetrates and diffuses" through the membrane due to the concentration gradient or the pressure differential, but not such that a liquid as applied thereto "passes through the pores" in the membrane.

As being different in principle from ordinary filtration membranes, the filtration membrane of the present invention shall have the following three advantages.

(1) It is easy to design the filtration membrane to have an extremely high-level filtration capacity, for example, capable of effecting molecular filtration therethrough.

Specifically, it is possible to design the filtration membrane of the invention to have an extremely fine filtration ability to pass therethrough even substances somewhat larger than the molecular size of the oleophilic organic liquid as applied to the membrane, by controlling the crosslink density of the membrane. It is also possible to freely design the filtration capacity of the membrane in accordance with its use. Therefore, the filtration membrane of the present invention can be effectively utilized for separation and analysis of oleophilic organic liquids having a dispersion phase of fine particles.

(2) Since the filtration membrane of the present invention has a relatively large filtration resistance even to substances which are smaller than the inter-crosslink spaces in the membrane and have no affinity for the membrane (for example, hydrophilic substances), the membrane can separate such smaller substances. For example, when the inter-crosslink spaces in the membrane are from 200 to 700 nm in size, the membrane can easily separate soot of 20 nm order to be contained in lubricating oils or even abraded powder or dust of 100 nm order to be therein.

(3) As having innumerable inter-crosslink spaces on the whole surface, the filtration membrane of the present invention does not clog substantially semi-permanently.

Next, the oleophilic polymer material for use in the present invention is in a gel-like condition or a dry glue-like condition. The gel-like condition as referred to herein indicates such that the oleophilic polymer material has swelled with an oleophilic organic liquid as penetrated into the crosslink tissue of the three-dimensional crosslink structure of the polymer material. The dry glue-like condition as referred to herein indicates such that the oleophilic polymer material in the gel-like condition has been dried by removing the oleophilic organic liquid from the gel-like material.

Specifically, the filtration membrane for oleophilic organic liquids of the present invention shall be in a gel-like condition containing an oleophilic organic liquid during manufacture. After manufacture, the membrane loses the oleophilic organic liquid to be in a dry glue-like condition, while still maintaining its gel-like condition.

Accordingly, the capacity of the filtration membrane of the present invention does not change during manufacture and during use after manufacture. Therefore, the filtration membrane of the invention can filter oleophilic organic liquids therethrough, while maintaining its original affinity for oleophilic organic liquids. For these reasons, oleophilic organic liquids as applied to the filtration membrane can pass smoothly through the membrane, and the filtration capacity of the membrane is therefore high.

It is desirable that the inter-crosslink spaces in the three-dimensional crosslink structure of the filtration membrane of the present invention are filled with molecules of an oleophilic organic liquid capable of passing through the spaces (see FIG. 1). Accordingly, when an oleophilic organic liquid containing impurities is applied as the feed to the filtration membrane of the invention, the impurities having molecular weights comparable to or smaller than the those of the oleophilic organic liquid as previously filled into the filtration membrane are separated.

In this separation process, the oleophilic organic liquid as previously filled into the inter-crosslink spaces acts as if the oleophilic organic liquid as applied to the filtration membrane dissolves in the liquid, then diffuses into the filtration membrane and thereafter passes out of the opposite surface of the membrane, or, that is, the liquid in the inter-crosslink spaces acts as a filtration promoter for the filtration membrane. Therefore, the flow of the feed passing through the filtration membrane moves smoothly, and the filtration capacity of the membrane is therefore increased.

Since the filtration membrane of the present invention can separate the oleophilic organic liquid from the feed through dissolution followed by dispersion, as mentioned hereinabove, it is free from a clogging phenomenon which is seen in ordinary filtration membranes, and the filtration operation through the membrane of the invention can be attained smoothly. Therefore, if the filtration membrane of the present invention is used for separation and purification of oleophilic organic liquids in chemical industry; it can effectively exhibit its advantages.

It is also desirable that the inter-crosslink spaces in the three-dimensional crosslink structure of the filtration membrane of the present invention are larger than the molecules of the oleophilic organic liquid to be filtered but are not larger than 1000 nm in terms of the mean diameter thereof. If the mean diameter of the inter-crosslink spaces is not larger than the molecules of the oleophilic organic liquid to be filtered, the liquid could not pass through the filtration membrane so that the filtration capacity of the membrane would be lowered. On the other hand, if the mean diameter of the inter-crosslink spaces is larger than 1000 nm, the filtration membrane of the invention would not be so much differentiated from the conventional filters having pores as physically formed therethrough with the result that the former would also easily clog like the latter.

It is desirable that the oleophilic polymer material of the filtration membrane of the invention is supported by a support. Accordingly, the mechanical strength of the filtration membrane for oleophilic organic liquids of the present invention, if supported by a support, can be enhanced while still maintaining the high filtration capacity of the membrane. In addition, it is easy to handle the thus-supported membrane.

An oil-containing, gel-like, oleophilic polymer material is soft, like "tokoroten" (water-containing, jelly-like cake prepared from agar or gelatin). The filtration membrane of the present invention made of such an oleophilic polymer material must be in the form of a thin film in order to ensure a constant filtration rate. However, the mechanical strength of the membrane itself of an oleophilic polymer is extremely poor. Therefore, if such an oleophilic polymer material is supported by a support, as mentioned in the above, the resulting filtration membrane can be satisfactorily shaped and can have an increased mechanical strength resistant to the pressure that will be necessary for filtration operation.

The supporting material includes, for example, a lining material to be attached to the back surface of the filtration membrane thereby making the membrane have an almost fixed shape, and a polymer retaining material into which the polymer material for the filtration membrane is infiltrated thereby making the membrane have an increased mechanical strength.

As the lining material mentioned above, for example, usable is a resin film. As the polymer retaining material mentioned above, for example, usable is a substrate with good liquid retentiveness, preferably a glass fiber filter.

Figure 2:
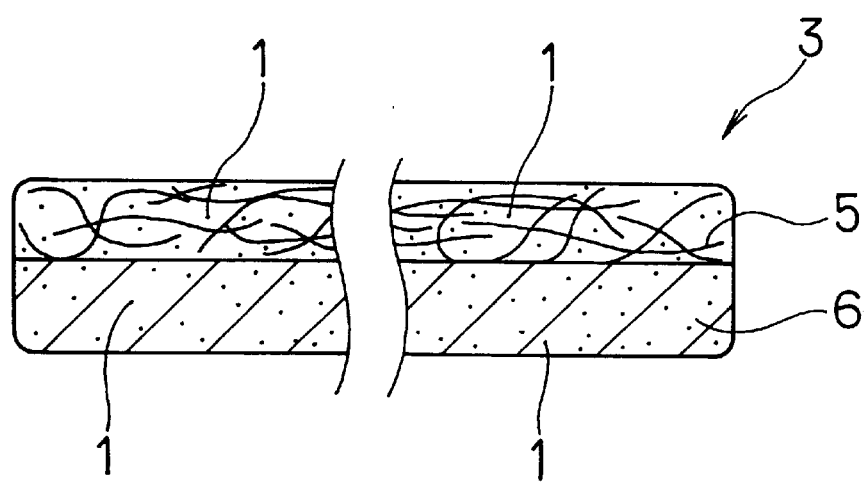
FIG. 2 is an explanatory view illustrating the cross section of the filtration membrane for oleophilic organic liquids of the present invention, as prepared in Example 1.

One embodiment of the supported filtration membrane of the present invention is mentioned, with reference to FIG. 2. As in FIG. 2, the supported filtration membrane is composed of a polymer retaining material 5 of a glass fiber filter having pores of about 0.5 $\mu$m in diameter, and a lining material 6 that is composed of a non-woven polyester fabric having pores of about 10 $\mu$m in diameter and a cellulose acetate coat, the two materials 5 and 6 being layered.

The two materials 5 and 6, acting as a core in combination, carry therein molecules of an oleophilic polymer material in such a manner that the molecules, as having penetrated into the two materials, have been crosslinked throughout these two in a gel-like or dry glue-like condition.

The thickness of the filtration membrane of the present invention can be determined relatively to the filtration capacity of the membrane and to the filtration rate through the membrane.

The oleophilic polymer for use in the present invention includes thermoplastic resins, for example, polycarbonate resins, acrylic resins, ABS resins, acetal resins, coumarone indene resins, ketone resins, regenerated celluloses, petroleum resins, cellulose derivatives, fluorine resins, polyamides, polyimides, polyethylenes, polyethylene terephthalates, polyvinylidene chlorides, polyvinyl chlorides, polysulfones, polyphenylene oxides, etc.

It also includes thermosetting resins, for example, silicone resins, amino resins, vinyl ester resins, phenolic resins, epoxy resins, allyl resins, alkyd resins, vinyl ethers, unsaturated polyester resins, furan resins, polyamidimides, polyimides, etc.

The oleophilic polymer further includes natural rubber analogs, such as natural rubbers to be obtained from *Hevea brasiliensis,* as well as cyclized natural rubbers, liquefied natural rubbers, gutta-percha, chicle rubber, balata, etc.; and also other rubbers such as acrylic rubbers, ethylene-acrylic rubbers, ethylene-propylene rubbers, silicone rubbers, hydrogenated NBRs, carboxylated NBRs, urethane rubbers, chlorinated polyethylenes, chlorosulfonated polyethylenes, chloroprene rubbers, brominated butyl rubbers, fluorine rubbers, polyether rubbers, polysulfide rubbers, polyester rubbers, epichlorohydrin rubbers, epichlorohydrin-oxime rubbers, ethylene-vinyl acetate rubbers, etc.

The oleophilic polymer still includes thermoplastic elastomers, such as thermoplastic polystyrene elastomers, thermoplastic polyolefin elastomers, thermoplastic polyurethane elastomers, thermoplastic polyester elastomers, thermoplastic polyamide elastomers, thermoplastic 1,2-polybutadiene elastomers, thermoplastic ethylene-vinyl acetate elastomers, thermoplastic polyvinyl chloride elastomers, thermoplastic fluorine rubber elastomers, thermoplastic trans-polyisoprene elastomers, thermoplastic polyethylene chloride elastomers, etc. However, these are only examples of the polymer for use in the present invention but are not limitative.

According to the second aspect of the present invention, non-crosslinked molecules of an oleophilic polymer having crosslinkable points are mixed with an oleophilic organic liquid that does not crosslink with the oleophilic polymer molecules thereby crosslinking the non-cross-linked, oleophilic polymer molecules to form a three-dimensional crosslink structure. As a result of this reaction to crosslink the oleophilic polymer molecules, produced is a filtration membrane for oleophilic organic liquids in which the molecules of an oleophilic organic liquid have been dispersed in the matrix of the oleophilic polymer in a gel-like condition. During the reaction, the oleophilic organic liquid does not react with the oleophilic polymer molecules. Therefore, the molecules or fine liquid drops of the oleophilic organic liquid act just like a core to be used in the production of metal castings.

In that manner as above, the non-crosslinked molecules of the oleophilic polymer are crosslinked with each other while enveloping the molecules of the oleophilic organic liquid, thereby forming a three-dimensional crosslink structure. Accordingly, the process easily gives the filtration membrane for oleophilic organic liquids of the present invention.

The inter-crosslink spaces in the three-dimensional crosslink structure thus formed are filled with the molecules of the oleophilic organic liquid. Accordingly, the filtration membrane of the present invention, as having the three-dimensional crosslink structure, can separate fine molecules similar to the molecules of the oleophilic organic liquid from molecules or particles larger than the molecules of the oleophilic organic liquid. Therefore, according to the method of the invention mentioned above, it is easy to design a filtration membrane to have a fine filtration capacity in the same degree as that of the molecules of the oleophilic organic liquid.

When an oleophilic organic liquid containing impurities is applied as the feed to the filtration membrane for oleophilic organic liquids thus produced according to the method of the invention mentioned above, the oleophilic organic liquid as previously filled into the inter-crosslink spaces in the membrane acts as the filtration promoter for the membrane, as so mentioned hereinabove.

Accordingly, the feed of the oleophilic organic liquid as applied to the filtration membrane can flow smoothly through the membrane, and the filtration capacity of the membrane can be increased. In addition, the filtration membrane of the invention thus produced is free from a clogging phenomenon that is seen in ordinary filtration membranes, and the filtration operation through the membrane of the invention can be effected stably. Moreover, as being naturally oleophilic, the filtration membrane does not require any solvent substitution and therefore can be produced easily. Further, the filtration membrane of the invention thus produced has low filtration resistance to oleophilic organic liquids such as oils.

The crosslinking reaction of the oleophilic polymer molecules can be initiated or promoted, for example, by the addition of a crosslinking agent, a crosslinking promoter or the like, or under heat.

If desired, the oleophilic polymer molecules may be mixed with the oleophilic organic liquid, for example, while dissolving them in a solvent common to these. Alternatively, these may be mixed together in the absence of a solvent (or after the removal of the solvent, if used) to thereby crosslink the oleophilic polymer molecules.

As a result of the reaction, the oleophilic polymer is crosslinked to a suitable degree to give a three-dimensionally crosslinked organic polymer structure having therein spaces into which the molecules of the oleophilic organic solvent have been introduced.

If the oleophilic polymer is highly viscous and if it is desired to mix with the oleophilic organic liquid in the absence of a solvent, the two can be kneaded, for example, with a kneader and thereafter the polymer can be subjected to the intended crosslinking reaction.

The crosslinked organic polymer thus crosslinked in the presence of the oleophilic organic liquid can absorb any oleophilic organic liquid (or can swell with any oleophilic organic liquid) but does not dissolve in it.

If the oleophilic polymer is a saturated one and, in particular, if it contains fluorine, the crosslinked polymer can have high heat resistance. It is desirable that the oleophilic polymer to be crosslinked according to the present invention is one that have a high degree of saturation in its main chain and have a crosslinkable group, such as a saturated bond, a carboxyl group, an epoxy group or the like, in its side chains. It is also possible to use, as the oleophilic polymer to be crosslinked, an oleophilic polymer having no side chain but having a crosslinkable group in its main chain. As a result of the crosslinking of the oleophilic polymer, obtained is a heat-resistant gel-like or dry glue-like structure of the polymer.

The filtration membrane of the present invention thus made of such a crosslinked organic polymer with high heat resistance can be used for filtering any high-temperature feed therethrough. The high-temperature filtering operation lowers the viscosity of the feed and increases the diffusion rate of the feed into the filtration membrane. Accordingly, this operation can increase the filtration rate of the feed through the membrane.

The ratio of the oleophilic polymer to the oleophilic organic liquid to be dissolved in a solvent varies, depending on the crosslinking agent and the crosslinking promoter used, and therefore cannot be determined unconditionally. However, if the proportion of the oleophilic organic liquid is too small, the crosslink density of the membrane produced shall be too large with the result that the feed as applied to the membrane in its practical use could hardly pass through the membrane. On the contrary, if the proportion of the oleophilic organic liquid is too large, the crosslink density of the membrane produced shall be too small with the result that the membrane could not be resistant to the pressure differential to be applied thereto in its practical use, or, that is, the membrane produced shall have poor mechanical strength.

Referring to one example for a certain type of butadiene rubber, it was found that the ratio of the oleophilic polymer to the oleophilic organic liquid was suitably 1:18. As another example for silicone rubber, it was found that the ratio of the oleophilic polymer to the oleophilic organic liquid was suitably 1:2.

To crosslink the oleophilic polymer, employable are various known methods, such as a method of chemically crosslinking the polymer at its unsaturated bond or functional group, a method of utilizing hydrogen bonding, ionic bonding and crystallization, a method of physically crosslinking the polymer by radicals to be generated through irradiation, etc. Such methods shall not be specifically defined. Apart from these, also employable is a method of chemically self-crosslinking the polymer. Depending on the type of the oleophilic polymer to be crosslinked and on the crosslinking method to be employed, neither crosslinking agent nor crosslinking promoter may be required.

The three-dimensionally crosslinked, organic polymer structure as obtained as a result of the crosslinking of the oleophilic polymer can be either in a gel-like condition in which the molecules or fine liquid drops of the oleophilic organic liquid have been filled into the inter-crosslink spaces in the structure, or in a dry glue-like condition to be formed by removing the oleophilic organic liquid from the previous gel-like structure to such a degree that the oleophilic organic liquid can again penetrate into the dry glue-like structure. The gel-like or dry glue-like structure can be produced by employing known techniques of, for example, solution polymerization, suspension polymerization, emulsion polymerization, etc.

To produce the crosslinked organic polymer such as that mentioned above, it is possible to optionally add to the reaction system a crosslinking agent and a crosslinking promoter, such as peroxides, sulfur compounds, thiazoles, amine compounds, etc., and also any other various additives needed.

It is desirable that the mixing of the oleophilic polymer molecules with the oleophilic organic liquid is followed by infiltrating or applying the resulting mixture into or onto a support, and thereafter by crosslinking the non-crosslinked oleophilic polymer molecules to form a three-dimensional crosslink structure. The process gives the supported filtration membrane for oleophilic organic liquids of the present invention, as previously mentioned hereinabove.

Specifically, according to this process, a crosslinked polymer structure as integrated with the support that acts as a core or a skeleton structure is produced. Therefore, the filtration membrane produced according to this process can have a predetermined shape and an increased mechanical strength and can be handled with ease in operation for filtering oleophilic organic liquids therethrough.

If the kind of the non-crosslinked oleophilic polymer molecules and that of the oleophilic organic liquid and also the mixing ratio of the two are appropriately selected and adjusted, it is possible to appropriately adjust the size and the number of the inter-crosslink spaces to be in the three-dimensional crosslink structure, thereby appropriately adjusting the kind and the amount of the oleophilic organic liquid to be passed through the filtration membrane within predetermined ranges.

As one example of the oleophilic organic liquid to be used in producing the filtration membrane according to the method of the present invention, mentioned is oil. The oil may include those mentioned hereinabove. Where oil is used as the oleophilic organic liquid in the method of the invention, the filtration membrane thus produced can exhibit an extremely excellent capacity in filtering and purifying oil.

According to the third aspect of the present invention, provided is a method for filtering an oleophilic organic liquid through the filtration membrane of the invention mentioned hereinabove, which is a three-dimensional crosslink structure having therein inter-crosslink spaces larger than the molecules of the oleophilic organic liquid as previously filled into the spaces. An oleophilic organic liquid that is the same as that previously added to the structure prior to the start of the crosslinking reaction to form the three-dimensional crosslink structure and that contains impurities larger than the molecules of the liquid is applied as the feed to one side of the filtration membrane of the invention, whereby the feed is filtered through the membrane. The oleophilic organic liquid in the feed can pass through the inter-crosslink spaces in the three-dimensional crosslink structure of the filtration membrane. Accordingly, the oleophilic organic liquid that was previously filled in the inter-crosslink spaces of the structure of the filtration membrane can act as the filtration promoter for the membrane, as so mentioned hereinabove.

Accordingly, the feed of the oleophilic organic liquid as applied to the filtration membrane can flow smoothly through the membrane, and the filtration capacity of the membrane can be increased. In addition, the filtration membrane used in the method of the invention is free from a clogging phenomenon that is seen in ordinary filtration membranes, and the filtration operation through the membrane of the invention can be effected stably. Moreover, the filtration membrane used in the method of the invention has low filtration resistance to oleophilic organic liquids, and the operation to filter such liquids through the membrane according to the method of the invention is easy. Further, the filtration method of the present invention can be applied to separation and purification of oleophilic organic liquids in chemical industry, and the filtration membrane used in the method can attain extremely excellent filtration results.

It is desirable that the oleophilic polymer material that constitutes the filtration membrane to be used in the method of the invention is supported by a support. As so mentioned hereinabove, the supported membrane can have an increased filtration capacity and an increased mechanical strength, with which, therefore, the filtration according to the method of the invention can be easy. The support may include, for example, a lining material and a polymer retaining material such as those mentioned hereinabove.

As one example of the oleophilic organic liquids to be applied to the method of the invention, mentioned is oil.

The impurities existing in the feed of the oleophilic organic liquid to be applied to the method of the invention shall be larger than the molecules or the liquid drops of the organic liquid and the kind of the impurities shall be different from that of the oleophilic organic liquid. Such impurities are, for example, those that may worsen the properties of the oleophilic organic liquid. The impurities include, for example, abraded powders, sludge, deteriorates of lubricating oil and soot, which, however, are not limitative. By removing such harmful impurities from the oleophilic organic liquid by the filtration according to the present invention, the thus-filtered liquid can be restored to its original condition. In addition, the thus-restored liquid can maintain its intrinsic properties for a long period of time.

In particular, sludge which is an oily deteriorate cannot be separated by ordinary filters, since it is liquid. According to the filtration method of the present invention mentioned above, since it is possible to freely design the molecular sizes of the molecules to be passed through the filtration membrane, sludge and its precursors that cannot be separated by ordinary filtration membranes can well be separated.

The lubricating oil that was used in diesel engines may contain a large amount of soot. Such soot comprises small particles of from several tens to several hundreds nm in size, and therefore cannot be separated by ordinary filters. However, since the property and the size of such soot are significantly different from those of the oleophilic organic liquid, lubricating oil, it can pass through the filtration membrane for the oleophilic organic liquid to be used in the method of the invention. Therefore, according to the method of the invention, soot comprising such small particles can well be separated.

Where the filtration method of the invention is applied to the purification of waste oils, it is possible to recover regenerated oils which are almost comparable to fresh oils.

Some impurities existing in oleophilic organic liquids that may be applied to the present invention are valuable in industrial use. Using the filtration membrane of the present invention, it is possible to recover such useful impurities to recycle them. Thus, the present invention is advantageous in saving natural resources.

DESCRIPTION OF PREFERRED EMBODIMENTS OF THE INVENTION

Example 1

One embodiment of the filtration membrane for oleophilic organic liquids of the present invention is described herein, with reference to FIG. 1 to FIG. 9 attached hereto.

The filtration membrane for oleophilic organic liquids of the present invention is made of an oleophilic polymer material having a three-dimensional crosslink structure. As in FIG. 1, each molecule 1 of an oleophilic polymer material are intermolecularly crosslinked at three or more crosslink points 11 to form the three-dimensional crosslink structure. Inter-crosslink spaces 10 in the three-dimensional crosslink structure are filled with molecules 2 of an oleophilic organic liquid capable of passing through the spaces 10.

The oleophilic polymer material is, as in FIG. 2, supported by a support that is composed of a polymer retaining material 5 and a lining material 6 as attached to the back surface of the material 5 to thereby maintain the shape of the filtration membrane in a predetermined form. The oleophilic polymer molecules 1 have been infiltrated into the polymer retaining material 5 and the lining material 6. The oleophilic polymer material employed herein is butadiene rubber. As the polymer retaining material 5, employed herein is a glass fiber filter (GC50, produced by Toyo Filter Co.). As the lining material 6, employed herein is CMF (Y100A, produced by Toyo Filter Co.).

The total thickness of the filtration membrane 3 employed herein is 0.4 mm.

The method for producing the filtration membrane 3 is described below.

First, the oleophilic polymer material, butadiene rubber (JSR-BR71), a crosslinking agent, benzoyl peroxide, and an oleophilic organic liquid, synthetic lubricating oil (SHF61, produced by Mobile Petroleum Co.) were prepared. The synthetic lubricating oil consists essentially of a poly-alpha-olefin oligomer. Next, 0.067 g of the butadiene rubber, 0.007 g of benzoyl peroxide, 0.03 g of divinyl benzene and 1.25 g of the synthetic lubricating oil were dissolved in toluene to prepare a toluene solution.

Next, the toluene solution was put into a Petri dish made of polytetrafluoroethylene (PTFE), along with the lining material, CMF having a diameter of 47 mm and the polymer retaining material, glass fiber filter (GC50) having a diameter of 47 mm. This Petri dish was heated in a two-neck separable flask on a water bath under heat at 95° C. for 4 hours, while introducing nitrogen into the flask. Thus heated, the polybutadiene rubber was crosslinked. After the reaction, the cured filtration membrane was taken out of the Petri dish.

Next, using the filtration membrane thus produced, engine oil was filtered therethrough according to the method mentioned below.

First, the filtration membrane was set in a pressure filtration device with the lining material of the membrane facing the low pressure space of the device. Next, a feed, engine oil as used in driving a car for 15000 km was put into the device in its high pressure space. The engine oil used herein is a lubricating oil (marketed under the trade name of Castle Clean SG by Toyota Motor Co.). Under this condition, pressure air of 5 kg/cm$^2$ was applied to the filtration membrane. After about 1 hour, a clean oil was filtered out through the filtration membrane into the low pressure space in the device.

Next, various lubricating oils were filtered through the filtration membrane of this example, whereupon each filtrate was analyzed and examined with respect to its infrared absorption spectrum.

Figure 3:
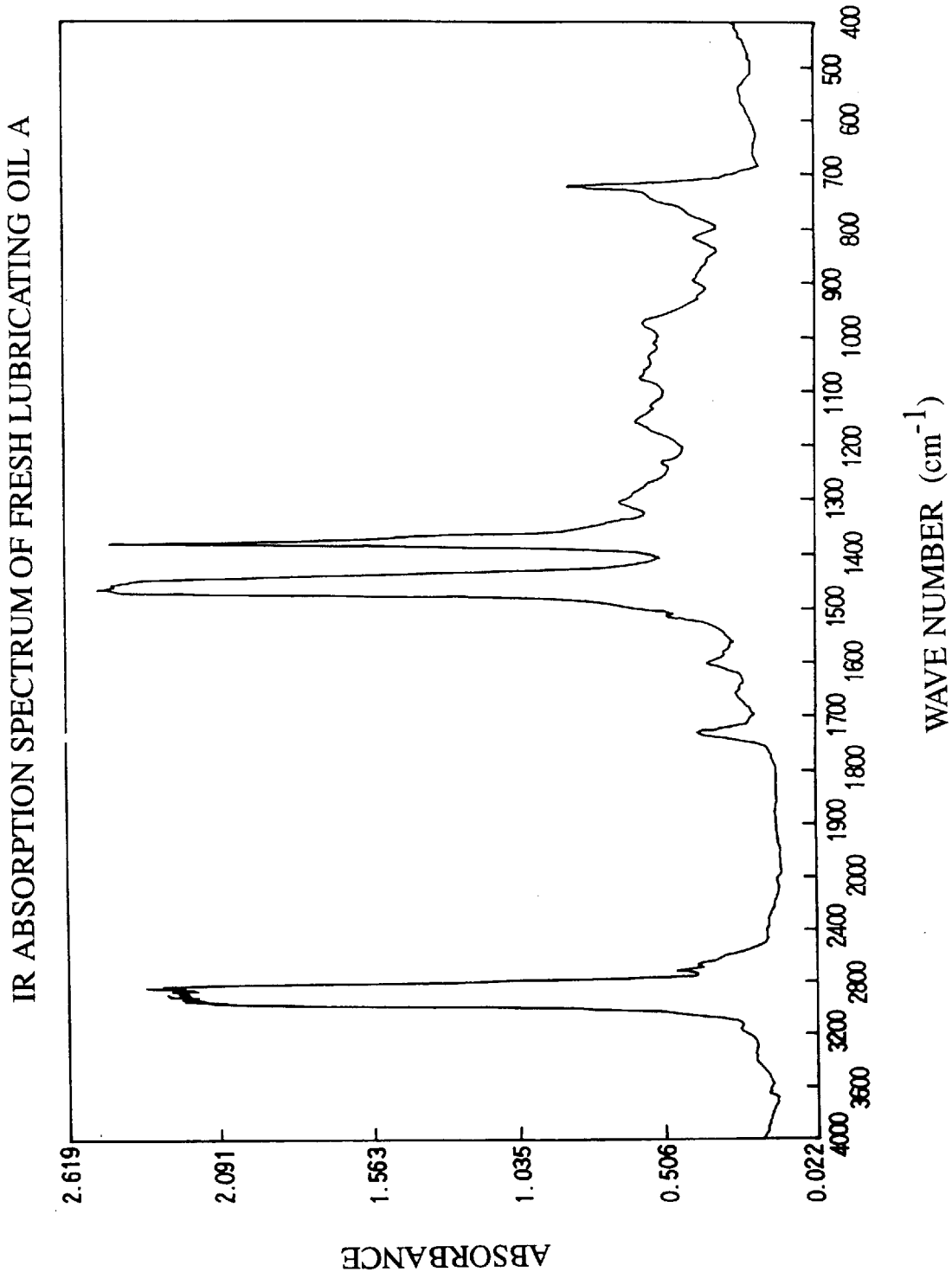
FIG. 3 is a graph showing the infrared absorption spectrum of lubricating oil A, as referred to in Example 1.
Figure 4:
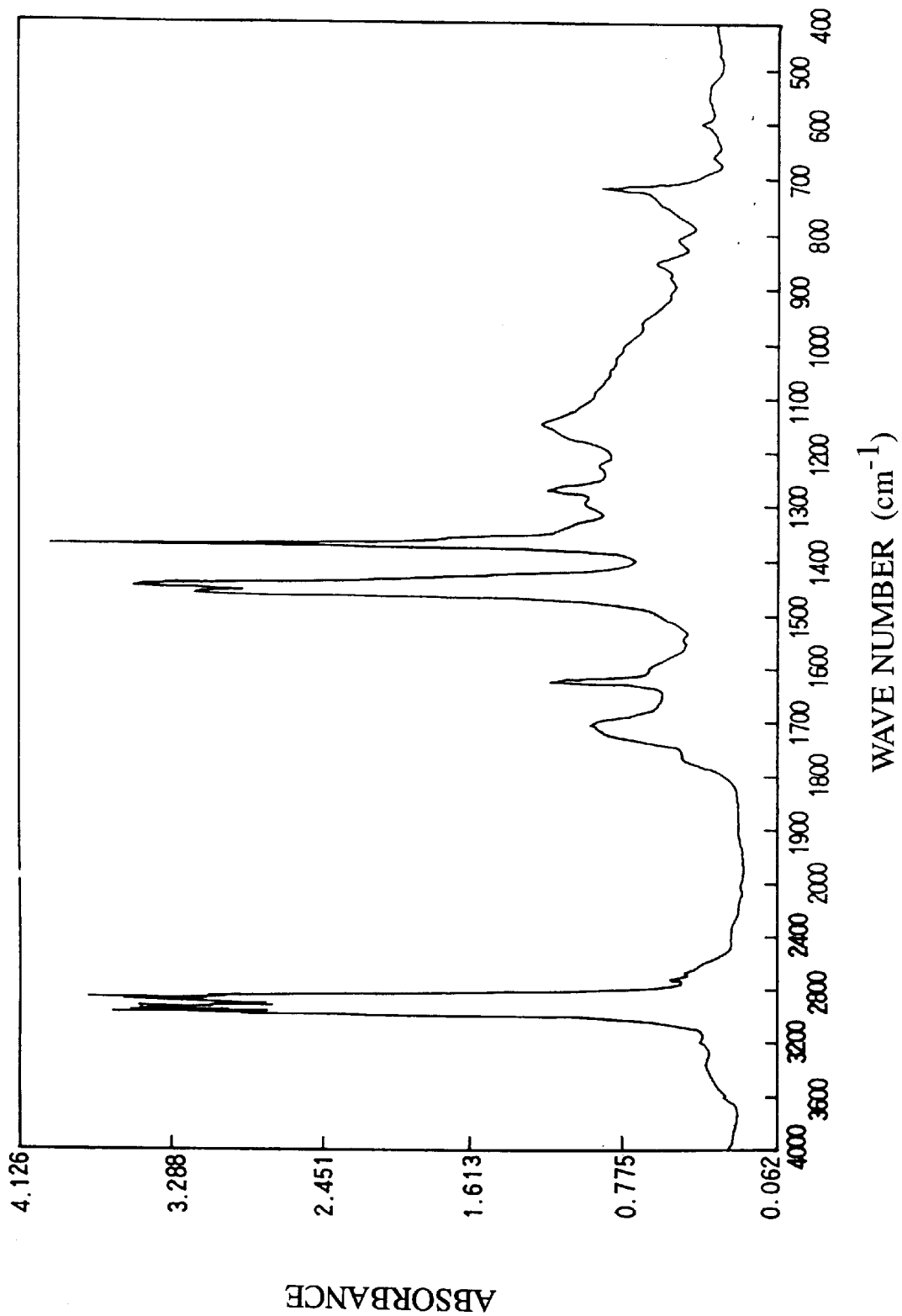
FIG. 4 is a graph showing the infrared absorption spectrum of lubricating oil B, as referred to in Example 1.
Figure 5:
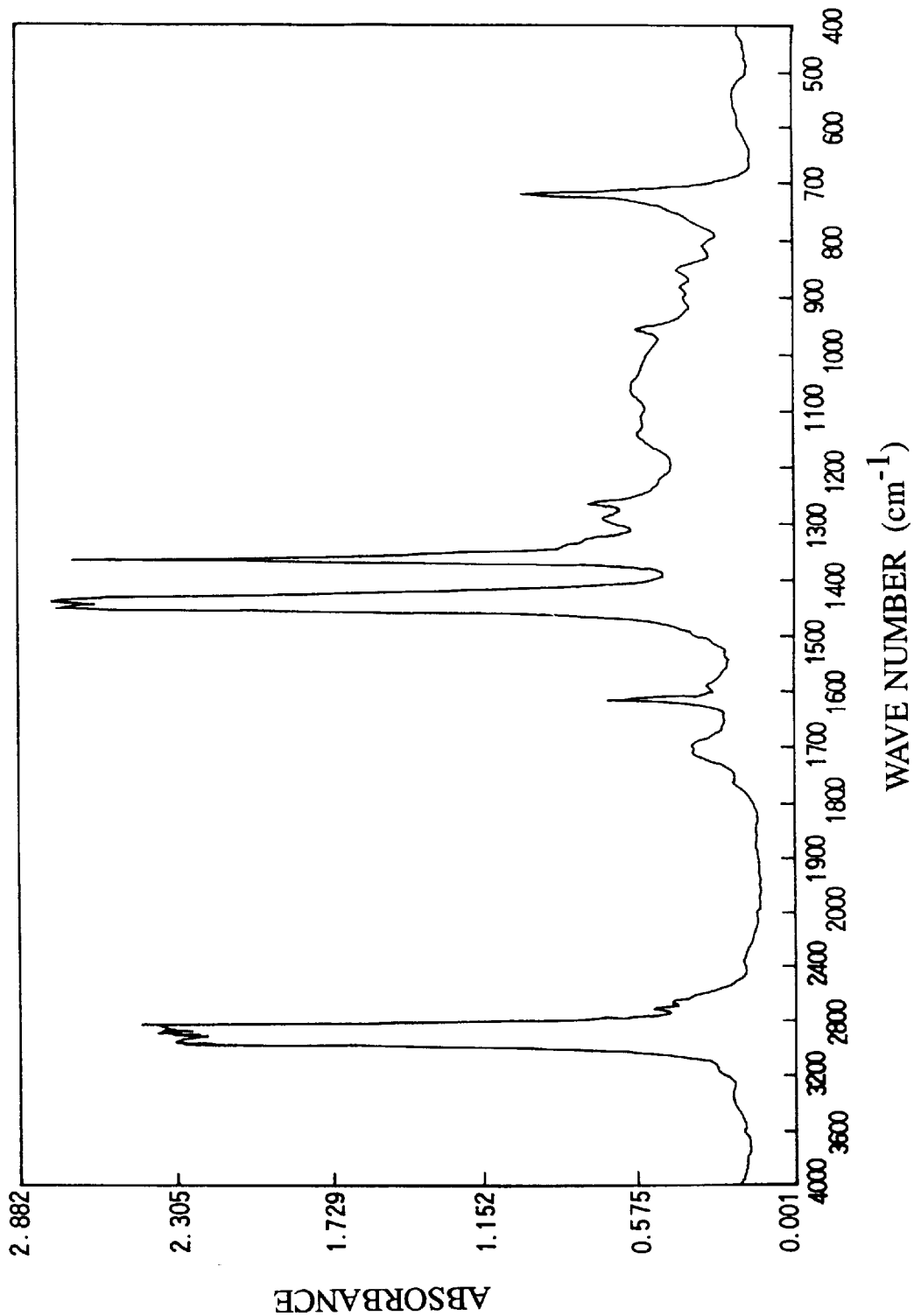
FIG. 5 is a graph showing the infrared absorption spectrum of lubricating oil C, as referred to in Example 1.

The results obtained are shown in FIG. 3 through FIG. 7. FIG. 3 shows the infrared absorption spectrum of fresh lubricating oil A (marketed under the trade name of Castle Clean SG by Toyota Motor Co.). FIG. 4 shows the infrared absorption spectrum of used lubricating oil B, which corresponds to lubricating oil A as used in a gasoline car for driving 15000 km. FIG. 5 shows the infrared absorption spectrum of purified lubricating oil C as obtained by purifying the used lubricating oil B through the filtration membrane of this example.

Figure 6:
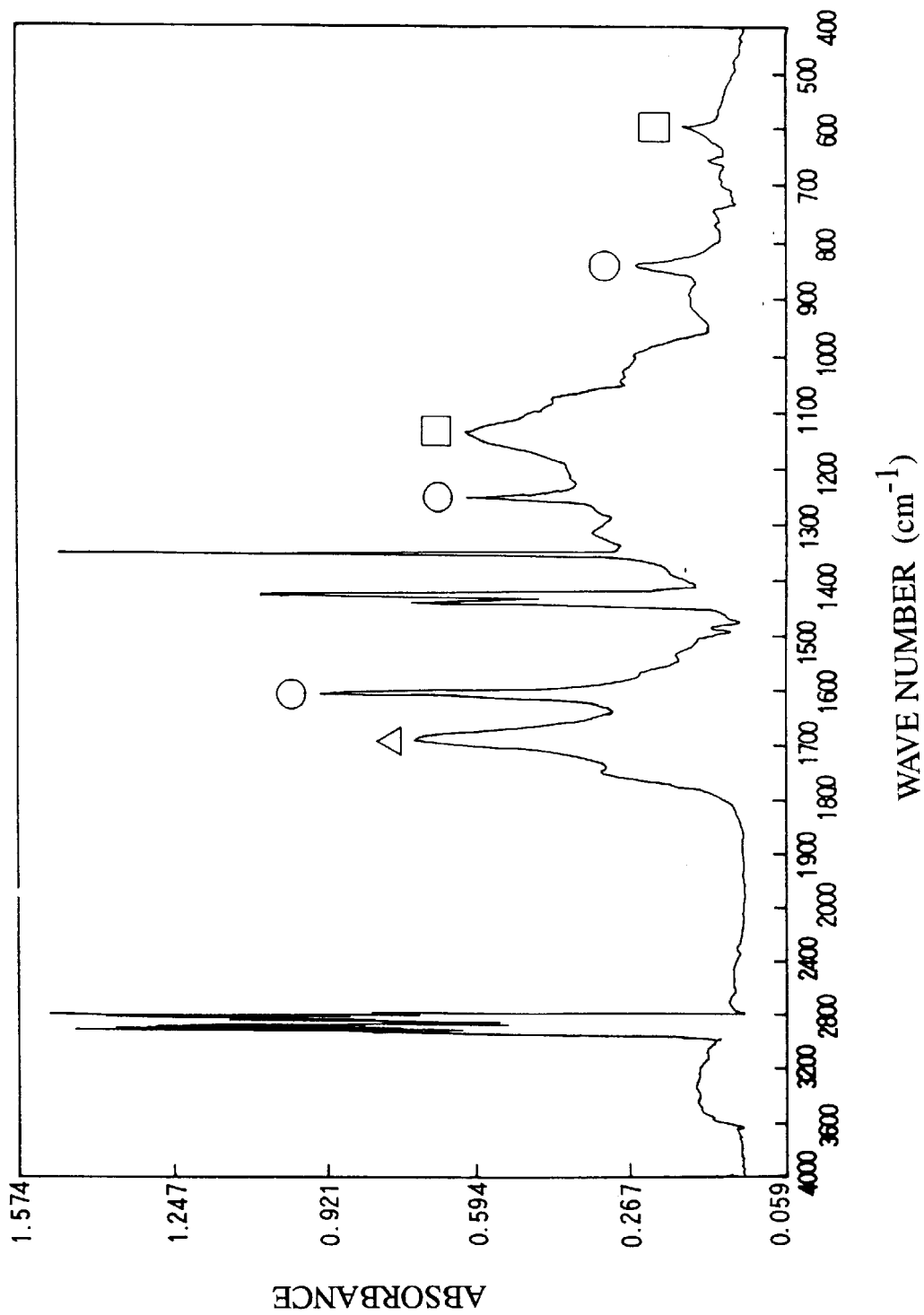
FIG. 6 is a graph showing the spectrum differential (lubricating oil B–lubricating oil A), as referred to in Example 1.
Figure 7:
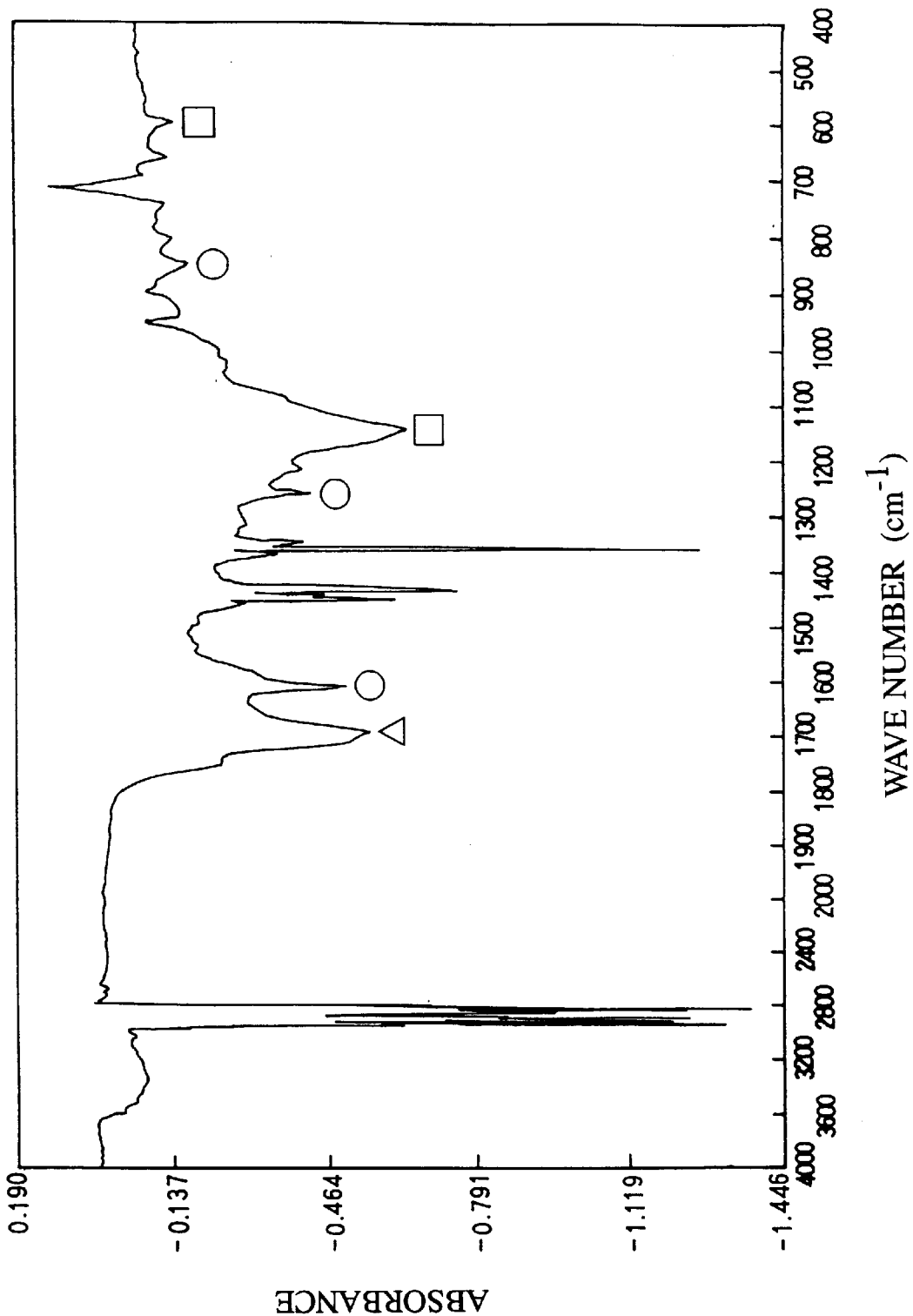
FIG. 7 is a graph showing the spectrum differential (lubricating oil C–lubricating oil B), as referred to in Example 1.

FIG. 6 shows a spectral differential (lubricating oil B–lubricating oil A) as obtained by subtracting the infrared absorption spectrum of FIG. 3 from the infrared absorption spectrum of FIG. 4. FIG. 7 shows a spectral differential (lubricating oil C–lubricating oil B) as obtained by subtracting the infrared absorption spectrum of FIG. 4 from the infrared absorption spectrum of FIG. 5.

The results obtained by the above-mentioned measurement are studied hereinunder.

As in FIG. 6, the used lubricating oil B contained larger amounts of sludge components than the fresh lubricating oil A. Namely, the nitrate content (corresponding to the peaks as designated by "○" in FIG. 6), the carboxyl compound and carbonyl compound content (corresponding to the peak as designated by "Δ" in FIG. 6), and the sulfuric acid content (corresponding to the peaks as designated by "□" in FIG. 6) increased in the used lubricating oil B. As in FIG. 7, the peaks for the sludge components decreased in the lubricating oil as purified through the filtration membrane. From these data, it is known that the sludge components in the used lubricating oil were effectively removed by the filtration through the filtration membrane of this example.

Next, the filtration capacity of the filtration membrane for oleophilic organic liquids of this example was examined.

In this test, a fresh lubricating oil was applied to the filtration membrane of this example, whereupon the molecular weight distribution of the filtrate that had passed through the membrane and that of the residue that had remained on the membrane without passing therethrough were measured according to GPC (gel permeation chromatography).

Figure 8:
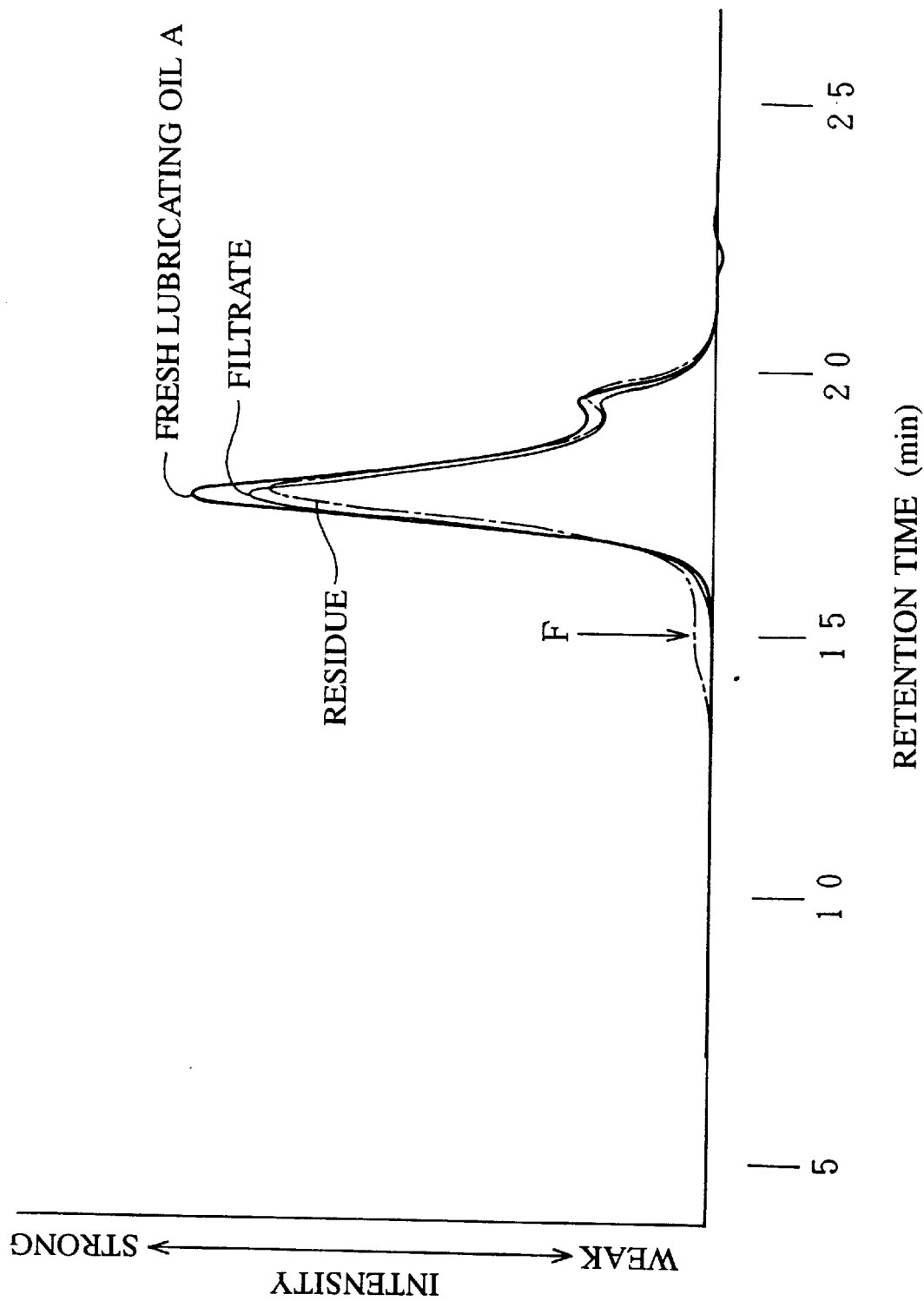
FIG. 8 is a graph showing the infrared absorption spectra of lubricating oil A, the filtrate of lubricating oil A and the filtration residue of lubricating oil A, as referred to in Example 1.

The results obtained are shown in FIG. 8. In FIG. 8, the thick line indicates the GPC chromatograph of the fresh lubricating oil A, the thin line indicates the GPC chromatograph of the filtrate of the fresh lubricating oil A that had passed through the filtration membrane in this test, and the dotted line indicates the GPC chromatograph of the residue of the fresh lubricating oil A that had remained on the filtration membrane without passing therethrough in this test. In FIG. 8, the horizontal axis indicates the retention time (min) for each sample, which is correlated with the molecular weight of each sample. The vertical axis indicates the intensity of the detector used for GPC, which is proportional to the amount of the component constituting each sample.

Figure 9:
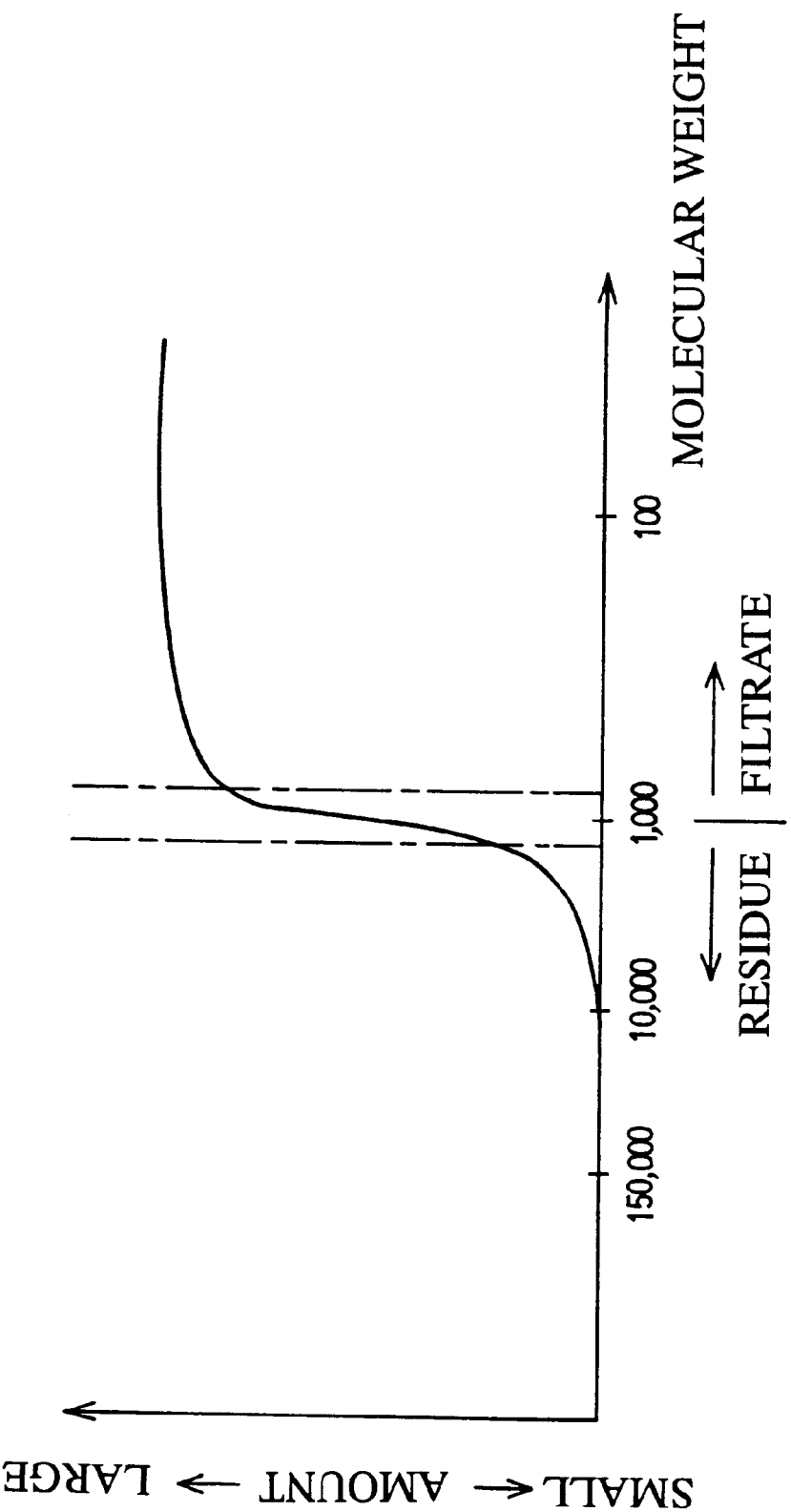
FIG. 9 is a curve indicating the relationship between the amounts of the filtrate and the residue as separated in Example 1 and the molecular weights of these.

In FIG. 8 dotted line showing the results of the test carried out with the residue of the fresh lubricating oil A has a projection, F, near the foot on the left side relative to the peak. It is believed that this projection, F indicates the components having a molecular weight of 1000. The projection F of the spectrum of the residue (dotted line) showed an intensity higher than that of the spectrum of the filtrate (thin line), from which it is understood that the filtration membrane of this example can accurately fractionate the components having molecular weights larger than 1000 from those having molecular weights smaller than 1000 relative to the specific molecular weight of 1000, as shown in FIG. 9.

Example 2

The filtration membrane for oleophilic organic liquids of this example differs from that of Example 1, in that silicone rubber was used as the oleophilic polymer material in the former while polybutadiene was used as the same in the latter.

The filtration membrane of this example was produced as follows. First, 0.2 g of silicone rubber (SH410, produced by Toray Co.), 0.02 g of benzoyl peroxide and 0.3 g of synthetic lubricating oil (PAO) were dissolved in toluene to prepare a toluene solution. Next, this toluene solution was put into a Petri dish, together with CMF and glass fiber filter, and heated for 4 hours in a nitrogen atmosphere on a water bath at 95° C., in the same manner as in Example 1. Thus was obtained the filtration membrane for oleophilic organic liquids of this example.

Next, an engine oil that had been used in driving a car for 15000 km was applied to the filtration membrane as the feed, in the same manner as in Example 1. After about 1 hour, a clean oil was filtered out through the filtration membrane into the low pressure space in the device.

Example 3

The filtration membrane for oleophilic organic liquids of this example was supported by a lining material, which was obtained by applying a crosslinked oleophilic polymer onto the support, lining material. The oleophilic polymer used herein was an ethylene-propylene rubber, and the lining material used herein was a non-woven polyester fabric.

The filtration membrane of this example was produced as follows. First, a toluene solution containing 0.07 g of ethylene-propylene rubber, 0.007 g of benzoyl peroxide, 0.06 g of divinylbenzene and 1.5 ml of oil was heated for 3 hours in nitrogen at 90° C., whereby the polymer was crosslinked. The thus-crosslinked polymer was applied onto the lining material, non-woven polyester fabric. Thus was obtained the filtration membrane of this example.

The filtration membrane of this example was produced by applying the crosslinked oleophilic polymer to the lining material, and its capacity was the same as the capacity of the filtration membranes of Examples 1 and 2 that had been produced by crosslinking the oleophilic polymer in the container together with the lining material and the polymer retaining material.

I claim:

1. A filtration membrane for filtering oil, comprising:

a crosslinked oleophilic polymer material, wherein the oleophilic polymer material is in a gel state containing a ratio of oil to oleophilic polymer material of at least 1.5:1.

2. A filtration membrane according to claim 1, wherein the crosslinked oleophilic polymer material has inter-crosslink spaces filled with molecules of an oleophilic organic liquid capable of passing through the inter-crosslink spaces.

3. A filtration membrane according to claim 2, wherein the inter-crosslink spaces have a mean diameter larger than a molecule of the oleophilic organic liquid but are not larger than 1000 nm.

4. A filtration membrane according to claim 1, wherein the oleophilic polymer material is supported by a support.

5. A method for producing a filtration membrane for oil, comprising:

mixing non-crosslinked oleophilic polymer molecules having a crosslinkable point with an oleophilic organic liquid that does not cross link with the oleophilic polymer molecules; and crosslinking the non-crosslinked oleophilic polymer molecules at the crosslinkable point to form a crosslinked oleophilic polymer material, wherein the crosslinked oleophilic polymer material is in a gel state containing a ratio of said oleophilic organic liquid to crosslinked oleophilic polymer material of at least 1.5:1.

6. A method for producing a filtration membrane according to claim 5, wherein the oleophilic polymer molecules are dissolved in a solvent, and the oleophilic organic liquid is dissolved in the solvent.

7. A filtration membrane for filtering oil, prepared by the method of claim 6.

8. A method for producing a filtration membrane according to claim 5, further comprising the step of infiltrating or applying the resulting mixture into or onto a support.

9. A filtration membrane for filtering oil, prepared by the method of claim 8.

10. A method for producing a filtration membrane according to claim 5, further comprising adjusting the size and the number of inter-crosslinked spaces in the crosslinked oleophilic polymer material by selecting a kind and a mixing ratio of the non-crosslinked oleophilic polymer molecules and the oleophilic organic liquid.

11. A filtration membrane for filtering oil, prepared by the method of claim 10.

12. A filtration membrane for filtering oil, prepared by the method of claim 5.

13. A method for filtering oil to remove impurities therefrom, comprising:

applying a solution comprising oil and impurities larger than a molecule of the oil to an oil filtration membrane, wherein the oil filtration membrane comprises a crosslinked oleophilic polymer material in a gel state containing a ratio of oil to oleophilic polymer material of at least 1.5:1.

14. A method for filtering an oleophilic organic liquid according to claim 13, wherein the oleophilic polymer material is supported by a support.

15. A method for filtering an oleophilic organic liquid according to claim 13, wherein the impurities are at least one of abraded powder, sludge, deteriorates of lubricating oil, and soot.

\* \* \* \* \*